UNITED STATES PATENT OFFICE.

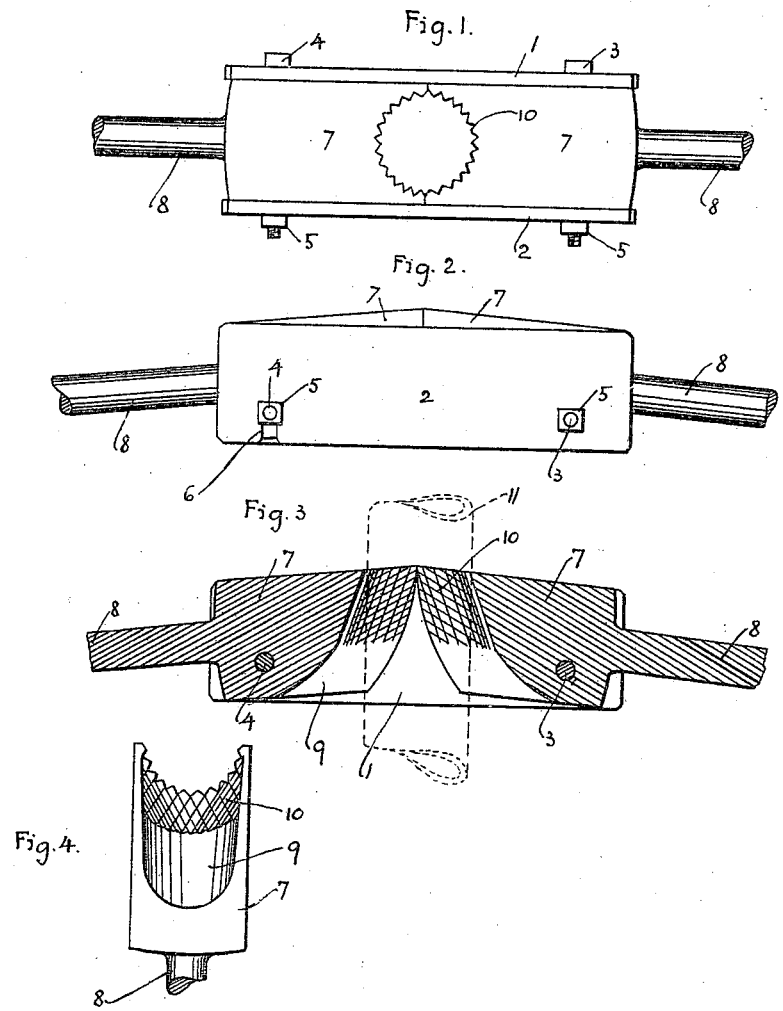

JOHN KEMMLER, OF TRESTLE, PENNSYLVANIA.

PIPE AND ROD GRIPPING DEVICE.

964,432.  Specification of Letters Patent.  Patented July 12, 1910.

Application filed April 29, 1909.  Serial No. 493,024.

*To all whom it may concern:*

Be it known that I, JOHN KEMMLER, a citizen of the United States of America, residing at Trestle P. O., in the county of Allegheny and State of Pennsylvania, have invented certain new and useful Improvements in Pipe and Rod Gripping Devices, of which the following is a specification, reference being had therein to the accompanying drawing.

This invention relates to a pipe and rod gripping device and the invention has for its object to provide a simple and durable device for obtaining a positive grip upon a pipe or rod, whereby said pipe or rod can be easily moved, either manually or by attaching a suitable pulling mechanism to the device.

A further object of the invention is to provide a pipe and rod gripping device with removable gripping blocks, whereby various sizes of blocks can be used for gripping pipes and rods of various diameters.

With the above and other objects in view which will more readily appear as the invention is better understood, the same consists in the novel construction, combination and arrangement of parts to be hereinafter described and then claimed.

Referring to the drawings:—Figure 1 is a plan of a pipe and rod gripping device constructed in accordance with my invention, Fig. 2 is a side elevation of the same, Fig. 3 is a longitudinal sectional view of the device, Fig. 4 is a bottom plan of one of the gripping members.

In the drawings, 1 and 2 designate two parallel oblong links having the ends thereof connected by bolts 3 and 4, and nuts 5, the link 2 having one end thereof provided with an open end slot 6, whereby said link can be swung into and out of engagement with the bolt 4, the object of which will presently appear.

Pivotally mounted upon the bolts 3 and 4 are gripping members 7 having the pivoted ends thereof provided with handles 8 of a sufficient length to permit of considerable leverage being obtained when using the device. The members 7 confront one another and have their inner ends cut away, as at 9, for pipe clearance and toothed or serrated as at 10, for positively gripping a pipe or rod 11.

With the link 2 loose at one end, it is not necessary to place the device down over the end of the pipe or rod, as the link can be opened, and the handles 8 brought downwardly together, whereby the device can be slipped upon a pipe or rod, the link closed, and then the handles 8 brought into longitudinal alinement whereby the teeth or serrations of the members 7 will bite into the pipe or rod and firmly grip the same.

It will be observed from the foregoing description that I have devised a novel pipe grip and lift, and that in many instances it will be unnecessary to use derricks or chain blocks to assist in elevating pipes that could not be otherwise easily moved without my grip.

While in the drawings there has been illustrated the preferred embodiments of the invention, I would have it understood that the detail construction thereof can be varied or changed as to shape, proportion and manner of assemblage without departing from the spirit of the invention.

Having now described my invention what I claim as new, is:—

A pipe clamp adapted for sidewise mounting on a pipe comprising a stationary and a pivoted link, means for connecting said links together in spaced relation, a pair of pipe gripping members pivotally mounted on said means and between said links and having the opposing faces thereof beveled, each of said beveled faces formed throughout with a semi-cylindrical pipe clearance and with the upper portion of the wall toothed, and an elongated hand grip extending from the outer end of each of said members for manually operating it, and said pivoted link provided with a recess at one end for engaging the connecting means whereby the same can be swung back to allow sidewise application of the clamp upon the pipe.

In testimony whereof I affix my signature in the presence of two witnesses.

JOHN KEMMLER.

Witnesses:
  MAX H. SROLOVITZ,
  A. J. TRIGG.